(12) United States Patent
Coburn

(10) Patent No.: US 6,553,626 B2
(45) Date of Patent: Apr. 29, 2003

(54) MAGNETIC HINGE

(75) Inventor: Richard David Blair Coburn, Ottawa (CA)

(73) Assignee: Lee Valley Tools, Ltd., Ottawa (CA)

( * ) Notice: Subject to any disclaimer, the term of this patent is extended or adjusted under 35 U.S.C. 154(b) by 0 days.

(21) Appl. No.: 09/940,343

(22) Filed: Aug. 27, 2001

(65) Prior Publication Data

US 2003/0056332 A1 Mar. 27, 2003

(51) Int. Cl.[7] .............................. E05D 5/10; E05D 11/10
(52) U.S. Cl. ........................... 16/386; 16/320; 16/385; 16/224; 16/DIG. 14
(58) Field of Search .................. 16/320, 386, DIG. 14, 16/385, 387, 319, 224, 268, 272; 359/811; 248/466, 467, 469, 472; 403/119, 161, 164, 165; 292/251.5

(56) References Cited

U.S. PATENT DOCUMENTS

| | | | |
|---|---|---|---|
| 2,615,738 A | 10/1952 | Johnson ........................ 287/96 |
| 2,627,423 A | 2/1953 | Copeman .................. 280/33.15 |
| 3,264,678 A | 8/1966 | Parmelee ..................... 16/128 |
| 3,287,760 A | 11/1966 | Moore .......................... 16/171 |
| 3,477,176 A | 11/1969 | Tansley ............................ 49/7 |
| 3,571,973 A | 3/1971 | Roberts ............................ 49/2 |
| 3,707,017 A | 12/1972 | Paquette ....................... 16/170 |
| 4,269,486 A | * 5/1981 | Shintani ..................... 359/226 |
| D263,721 S | 4/1982 | Miller ....................... D16/135 |
| 4,434,524 A | 3/1984 | Gilchrist ....................... 16/250 |
| 5,076,742 A | 12/1991 | Lee et al. .................... 408/112 |
| 5,255,006 A | 10/1993 | Pappas et al. .............. 343/915 |
| 5,862,848 A | 1/1999 | Beall ........................... 144/372 |
| 5,992,807 A | * 11/1999 | Tarulli ..................... 248/206.5 |
| 6,167,589 B1 | 1/2001 | Luedtke .......................... 16/71 |
| 6,182,331 B1 | 2/2001 | Hessenthaler ................ 16/387 |
| 6,217,170 B1 | * 4/2001 | Hsiao ......................... 351/153 |

FOREIGN PATENT DOCUMENTS

| | | | |
|---|---|---|---|
| DE | 3030293 | 4/1982 | |
| DE | 4034296 A1 | * 4/1992 | |
| EP | 0756056 A1 | * 1/1997 | |
| JP | 0019853 | 2/1977 | .......... E05D/7/786 |
| JP | 2000179227 A | * 6/2000 | |
| JP | 200289120 | * 3/2002 | |

* cited by examiner

*Primary Examiner*—Chuck Y. Mah
(74) *Attorney, Agent, or Firm*—John S. Pratt; Geoffrey K. Gavin; Kilpatrick Stockton LLP

(57) ABSTRACT

A magnetic hinge that connects and secures adjacent components while allowing for rotational movement of the components with respect to each other. The magnetic hinge may be incorporated into a magnetic stand magnifier or a variety of other structures. The magnetic hinge of this invention consists of an arm and a shaft with a magnet therebetween.

8 Claims, 2 Drawing Sheets

MAGNETIC HINGE

FIELD OF THE INVENTION

This invention relates to a magnetic hinge that connects and secures adjacent components while allowing for rotational movement of the components with respect to each other and a magnetic stand magnifier that provides a magnifying lens with the ability to pivot and rotate about a fixed base.

BACKGROUND OF THE INVENTION

Conventional mechanical hinges are among the oldest products of human technology. Hinged connections are useful in numerous applications requiring interconnection between components while permitting relative rotation at the point of connection. It is desirable that the components be capable of positive connection and disconnection as desired without the insertion or removal of special connecting parts or the use of special tools. Although there have been previous attempts to develop reliable magnetic hinges, the present invention provides a novel magnetic hinge that is both sturdy and useful.

An example of the usefulness of a magnetic hinge of this invention is illustrated by its use as part of a magnetic stand magnifier. Magnification reduces eyestrain and fatigue, which allows one to work longer with less visual effort. Since the magnification of an object is often secondary to another task, such as manipulating small objects, it is desirable to have a magnifier whose operation requires minimal activity. There are various types of magnifiers available, including hand-held magnifiers and stand magnifiers.

An advantage of stand, or mounted, magnifiers is that they allow both of a user's hands to be free. Whether taking measurements, cross stitching, or holding a newspaper, hands-free viewing is easier. In many situations, when a person needs a magnifier, the operation or work being performed is highly delicate and requires both hands of the user. When using a hand-held magnifier, the work can only be performed with the opposite hand. Thus, a stand magnifier is more convenient, and even required, in many instances. Furthermore, it is difficult to find the ideal position for the magnifier, eyes, viewed object, and light source when one hand is required to hold the magnifier.

Previous stand magnifiers have generally been limited in their use due to single-use type of stands. This severely limits the user and requires that the user keep multiple magnifiers for different purposes. Most stand magnifiers have the lens arranged parallel to the object to be viewed. Thus, in order to use the stand magnifier, the user has to lean over the magnifier to look vertically downward. The alternative is to tilt the viewed object and/or the stand magnifier to an angle where viewing is comfortable. This typically results in the user having to hold the magnifier to prevent it from slipping, essentially converting the magnifier into a hand-held magnifier.

SUMMARY OF THE INVENTION

The magnetic hinge of this invention connects and secures adjacent components while allowing for rotational movement of the components with respect to each other. The magnetic hinge may be incorporated into a magnetic stand magnifier, or a variety of other structures. An embodiment of the magnetic hinge of this invention consists of an arm and a shaft with a magnet therebetween. The flat mating surfaces of the arm and the shaft are in contact with each other and have corresponding flat-bottomed holes. The magnet is received in both of these holes and is attracted to both flat surfaces such that the magnet pulls the surfaces together and creates friction between the surfaces, while serving as an axle or hinge pin about which the arm and the shaft pivot.

The magnetic stand magnifier of this invention provides a magnifying lens with the ability to pivot and rotate about a fixed base. An embodiment of the magnetic stand magnifier of this invention includes a base, a magnetic hinge, and a magnifying lens. The base has one or more magnets on its bottom surface by which it may be attached to any ferromagnetic surface. The shaft of the magnetic hinge is inserted into a hole in the base and may be moved rotationally and longitudinally along the center axis of the base. A magnifying lens is coupled to the arm of the magnetic hinge. The friction between the arm and the shaft of the magnetic hinge is modest enough to allow the arm to pivot about the axis of the magnet, but strong enough to require positive action in order to move the arm, allowing the lens to remain at whatever inclination at which it is set. The magnetic stand magnifier can be used for numerous purposes including reading, craftwork, material inspection, and the assembly of small parts. A suitably sized version excels at facilitating reading a metal rule. Both the magnetic hinge and magnetic stand magnifier may be easily disassembled and conveniently placed in a small carrying case.

DETAILED DESCRIPTION OF THE INVENTION

Figure 1:
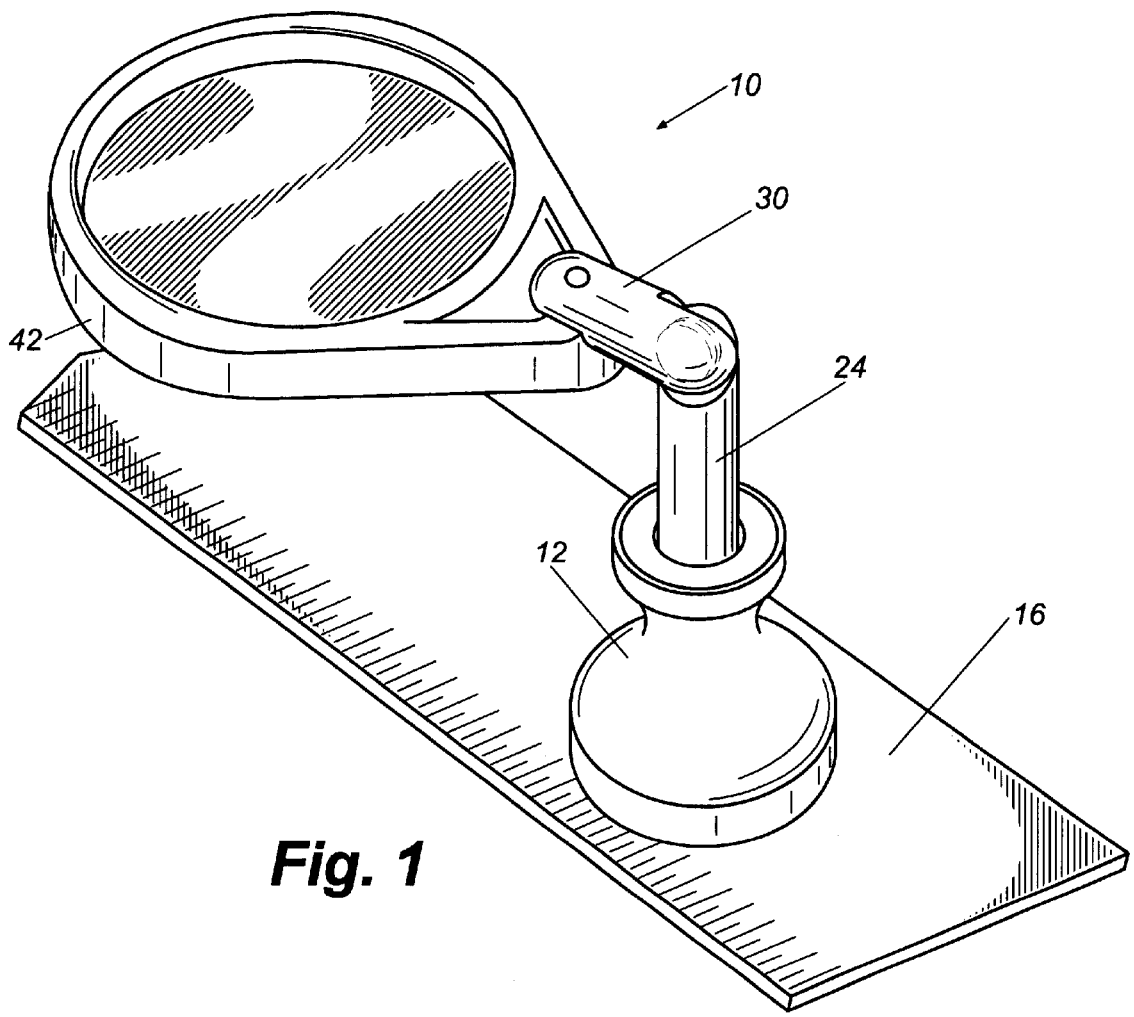
FIG. 1 is a perspective view of an embodiment of the magnetic hinge of this invention as part of an embodiment of the magnetic stand magnifier of this invention.
Figure 2:
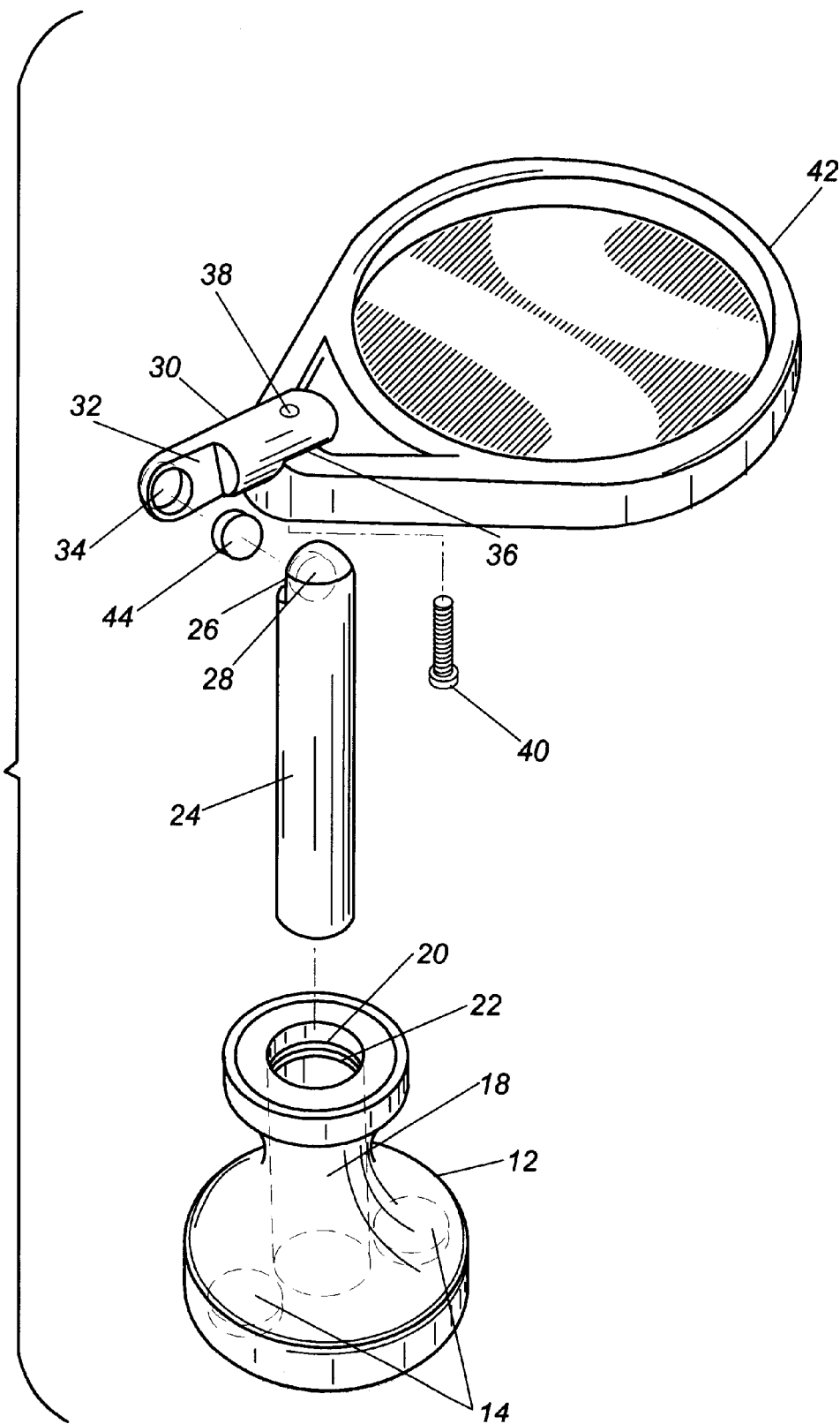
FIG. 2 is an exploded view of the embodiments shown in FIG. 1.

In an embodiment of this invention, a magnetic hinge is incorporated into a magnetic stand magnifier 10, as shown in FIGS. 1 and 2. A base 12 has magnets 14 in its bottom. Magnets 14 are attracted to any close ferromagnetic material, such as a ferromagnetic rule 16 as shown in FIG. 1, so that base 12 will remain attached to a ferromagnetic surface against which it is placed. Although the embodiment shown in FIG. 2 has two magnets, a single magnet may be used. Base 12 has a through-hole 18 along its center axis, as shown in FIG. 2. Through-hole 18 includes an annular depression 20 that holds an o-ring 22.

A round shaft 24 of appropriate diameter is inserted into through-hole 18. Shaft 24 is made of ferromagnetic material and has a friction fit with o-ring 22. This allows shaft 24 to be moved longitudinally and rotationally about the axis, while also providing sufficient friction so that shaft 24 will remain in position when movement is stopped. The top of shaft 24 is machined to have a flat face 26 lying on or near the longitudinal axis of shaft 24 with a shallow flat-bottomed or "blind" round hole 28.

An arm 30 interfaces with shaft 24, as shown in FIGS. 1 and 2. In a preferred embodiment, arm 30 is made from the same material and has the same diameter as shaft 24. Arm 30 has a flat face 32 with an integral, flat-bottomed or "blind" hole 34 at the end which interfaces with shaft 24, as shown in FIG. 2. In a preferred embodiment, hole 34 in arm 30 is generally deeper than hole 28 in shaft 24, but equal depth holes are also usable. The opposite end of arm 30 has a second flat face 36 and a threaded hole 38 to receive a machine screw 40. Flat face 36 is rotated 90 degrees from flat face 32, as shown in FIG. 2. A magnifying lens 42 is coupled to this end of arm 30 by machine screw 40.

As shown in FIG. 2, a cylindrical magnet 44 is placed in hole 34 of arm 30. Magnet 44 is positioned within the corresponding holes 28 and 34 of shaft 24 and arm 30, respectively, and effectively acts as a hinge pin or axle. Magnet 44 is attracted to both shaft 24 and arm 30 and pulls them together, causing contact between face 26 of shaft 24 and face 32 of arm 30. Arm 30 can pivot about the axis of magnet 44, but friction between flat faces 26 and 32 is sufficient for arm 30 and lens 42 to hold their positions when movement of arm 30 is stopped.

An acceptable level of friction is achieved by making the combined depth of holes 28 and 34 slightly greater than the thickness of magnet 44, so that flat faces 26 and 32 surrounding magnet 44 remain in contact with each other. This combination of attractive force and friction of the adjoining faces is sufficient to hold lens 42 in a fixed position. The combined depth of holes 28 and 34 must not be too much greater than the thickness of magnet 44; otherwise, the gap between the exposed face of magnet 44 and the adjacent attractive material will increase, diminishing the attractive force beyond what is necessary to support lens 42.

In another embodiment, magnet 44 is sunk flush to slightly below either arm 30 or shaft 24. The attractive force tends to keep the other hinge component (the part into which the magnet is not sunk) centralized as it is pivoted. The asymmetric flat-bottomed holes 28 and 34 provide improved registration at the joint, and the deeper flat-bottomed hole could be in either arm 30 or shaft 24. In a preferred embodiment, the deeper flat-bottomed hole 34 is in arm 30 to ensure that magnet 44 will remain in arm 30 when the arm is pulled away from shaft 24. This allows arm 30 to then be coupled to any ferromagnetic surface. An example of when this would be desirable is in making a long reach magnifier using a ferromagnetic rule.

The magnetic stand magnifier 10 of this invention can be used in the same manner as any stand or base-mounted magnifier. However, the magnets in the base allow the device to be placed in a fixed position on any ferromagnetic surface, such as a ferromagnetic rule. The lens may be adjusted to clarify a desired graduation such that a very fine line can be accurately transferred to the workpiece below. This allows fine increments, such as $\frac{1}{64}$ or $\frac{1}{10}$ of an inch, to be transferred with ease. Additionally, the magnetic stand magnifier of this invention can be placed on other ferromagnetic surfaces and used for numerous other purposes including reading, craftwork, material inspection, and the assembly of small parts.

The foregoing is provided for purposes of illustrating, explaining, and describing embodiments of this invention. Modifications and adaptations to these embodiments will be apparent to those skilled in the art and may be made without departing from the scope or spirit of the invention. For instance, magnets 14 and 44 can be magnets of various types, although powerful rare earth magnets work particularly well. The hinge can be used for devices other than magnifying lenses, such as lights, lamps, clips, or spring clamps. Different bases could be used such as, for instance, clamp-on bases, marble bases, or heavy duty plastic or metal bases.

What is claimed is:

1. A hinge comprising:

an arm made of ferromagnetic material, wherein a first end of the arm has a flat surface with a flat-bottomed hole therein;

a shaft made of ferromagnetic material, wherein a first end of the shaft has a flat surface with a flat-bottomed hole therein; and a magnet captured within the flat-bottomed hole of the arm and the flat-bottomed hole of the shaft, thereby securing the arm and the shaft while allowing for rotational movement of the arm and the shaft with respect to each other.

2. The hinge of claim 1, wherein the flat surface of the first end of the arm and the flat surface of the first end of the shaft are in contact.

3. The hinge of claim 1, wherein a combined depth of the flat-bottomed hole of the arm and the flat-bottomed hole of the shaft is slightly greater than a thickness of the magnet.

4. The hinge of claim 1, wherein a majority of the magnet is sunk into the flat-bottomed hole of the arm.

5. The hinge of claim 1, wherein a majority of the magnet is sunk into the flat-bottomed hole of the shaft.

6. The hinge of claim 1, wherein the magnet is sunk flush or slightly below the arm.

7. The hinge of claim 1, wherein the magnet is sunk flush or slightly below the shaft.

8. The hinge of claim 1, wherein the magnet is a rare earth magnet.

* * * * *